United States Patent
Dosaki et al.

(10) Patent No.: US 10,434,856 B2
(45) Date of Patent: Oct. 8, 2019

(54) WEATHER STRIP FOR AUTOMOBILE

(71) Applicant: TOYODA GOSEI CO., LTD., Kiyosu-shi, Aichi-ken (JP)

(72) Inventors: Tomohiro Dosaki, Kiyosu (JP); Yoshinobu Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/427,080

(22) Filed: Feb. 8, 2017

(65) Prior Publication Data
US 2017/0246939 A1    Aug. 31, 2017

(30) Foreign Application Priority Data

Feb. 26, 2016   (JP) .................................. 2016-035080

(51) Int. Cl.
- *B60J 10/74* (2016.01)
- *B60J 10/27* (2016.01)
- *B60J 10/30* (2016.01)

(52) U.S. Cl.
CPC .............. *B60J 10/74* (2016.02); *B60J 10/27* (2016.02); *B60J 10/30* (2016.02)

(58) Field of Classification Search
CPC ............. B60J 10/74; B60J 10/30; B60J 10/27
See application file for complete search history.

(56) References Cited

U.S. PATENT DOCUMENTS

| | | | | |
|---|---|---|---|---|
| 2002/0046499 | A1* | 4/2002 | Nozaki | B60J 10/74 49/441 |
| 2006/0021282 | A1* | 2/2006 | Tamaoki | B60J 10/74 49/441 |
| 2008/0191517 | A1* | 8/2008 | Kreye | B60J 10/30 296/201 |
| 2009/0021044 | A1* | 1/2009 | Maab | B60J 10/21 296/146.2 |
| 2012/0085029 | A1* | 4/2012 | Stockschlager | B60J 10/00 49/31 |
| 2013/0160375 | A1* | 6/2013 | Kuwabara | E06B 7/2303 49/490.1 |
| 2013/0219799 | A1* | 8/2013 | Takeuchi | B60J 10/04 49/472 |
| 2014/0075848 | A1* | 3/2014 | Masumoto | B60J 10/046 49/495.1 |
| 2016/0101675 | A1* | 4/2016 | Timmermann | B60J 10/18 296/93 |

FOREIGN PATENT DOCUMENTS

| | | |
|---|---|---|
| JP | 2002-187432 A | 7/2002 |
| JP | 2005-255113 A | 9/2005 |

\* cited by examiner

*Primary Examiner* — Gregory J Strimbu
(74) *Attorney, Agent, or Firm* — Posz Law Group, PLC

(57) ABSTRACT

A weather strip exhibiting excellent sealing properties is adapted to be attached after being divided into pieces. The weather strip has a seal member. The seal member includes an attaching base part, a window glass seal lip, a support member, a door seal lip extending from an attaching reference surface of the attaching base part, and an attaching engaging part for engagement with a division member such that when the window glass seal lip of the seal member contacts the interior surface of the window glass, the support member contacts the attaching base part to press the attaching base part.

6 Claims, 4 Drawing Sheets

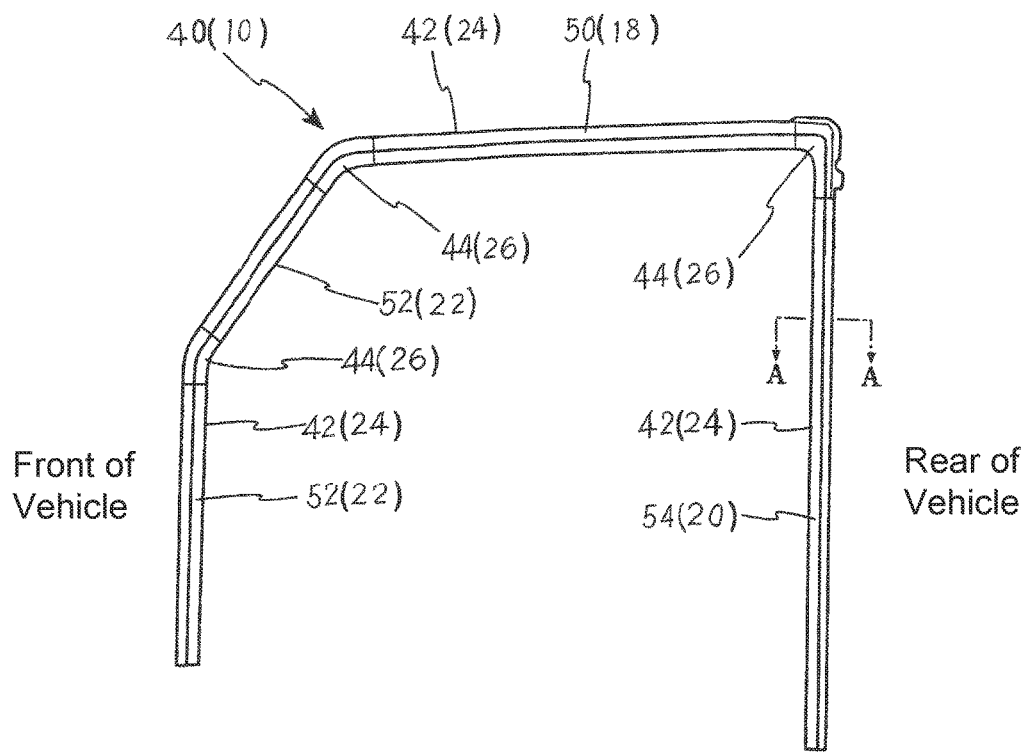
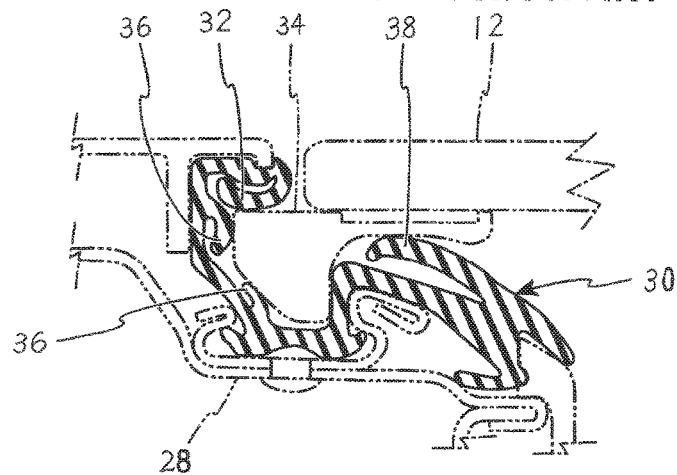

FIG. 5
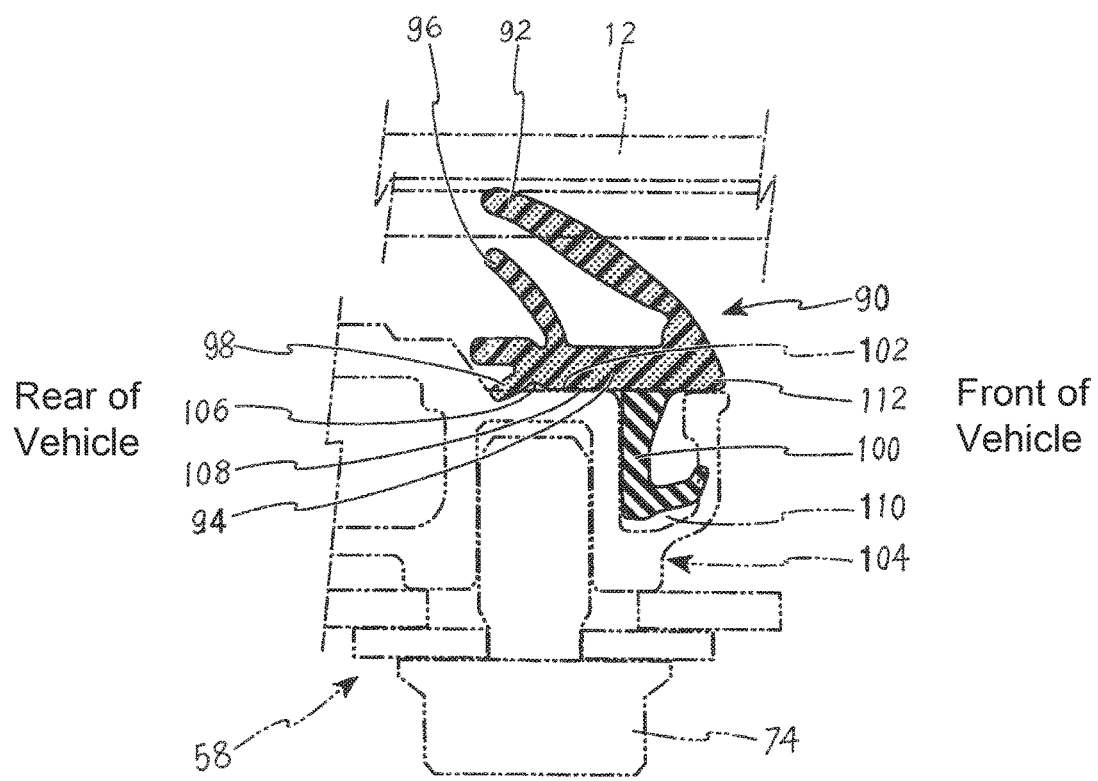
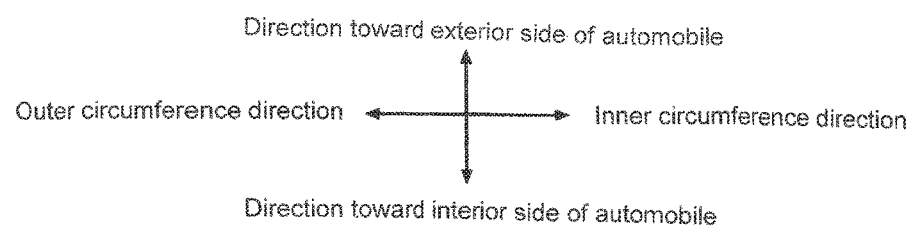

WEATHER STRIP FOR AUTOMOBILE

CROSS-REFERENCE TO RELATED APPLICATION

This application is related to and claims priority from Japanese patent Application No. 2016-035080 incorporated herein by reference.

BACKGROUND OF THE INVENTION

1. Field of the Invention

The present invention relates to a weather strip adapted to be attached to a door frame of an automobile door for providing a seal against a window glass.

2. Description of Related Art

As shown in FIG. 1, a weather strip 10 adapted to provide a seal against an interior surface of a window glass 12 is attached to a door frame 14 of an automobile door 16. An entire portion of such a conventional weather strip 10 is shown in FIG. 2, and the cross-sectional view of the conventional weather strip 10 for attachment to a straight part of the door frame 14 is shown in FIG. 3.

As shown in FIG. 2, the conventional weather strip 10 has an upper side part 18 for attachment to an upper side of the door frame 14, a rear vertical side part 20 for attachment to a rear vertical side of the door frame 14, and a front vertical side part 22 for attachment to a front vertical side of the door frame 14. The upper side part 18, the rear vertical side part 20 and the front vertical side part 22 define straight parts 24, each being manufactured by extrusion, and corner parts 26 adapted to connect the straight parts 24 to each other are further provided.

Conventionally, as shown in FIG. 3, in order to provide a seal between the window glass 12 and a door sash 28, a weather strip 30 has been used (see Publication of Japanese Patent application No. 2005-255113, for example). In the weather strip 30 for attachment to the door sash 28, a seal lip 32 contacts a tip end of the window glass 12 or a tip end of a slider member 34 to provide a seal against the window glass 12 or the slider member 34, and two seal lips 36 contact the slider member 34 in a direction toward an interior side of an automobile to provide a seal against the slider member 34. Furthermore, a seal lip 38 contacts the interior surface of the window glass 12 or an interior surface of the slider member 34 to provide a seal against the window glass 12 or the slider member 34.

The weather strip 30 thus complicatedly constructed, however, has such a problem that a space for attaching the weather strip 30 in the automobile door is narrow. In order to effect an improved assembling workability, the weather strip 30 may be formed by dividing the same into a plurality of pieces, and assembling them together.

Where the weather strip 30 is formed by dividing the same, and is attached to the automobile door, the stability of holding parts adapted to hold sealing parts of the weather strip 30 divided into a plurality of pieces, may be lowered. As a result, the sealing properties of the sealing parts of the weather strips 30 divided into a plurality of pieces, may be deteriorated.

SUMMARY OF THE INVENTION

It is an object of the present invention to provide a weather strip exhibiting excellent sealing properties even when the weather strip is attached after being divided.

In order to achieve the above-described object, in accordance with a first aspect of the present invention, in a weather strip for an automobile, which is attached to a door frame of an automobile door to provide a seal against an interior surface of a window glass, the window glass is held with a division member attached to the automobile door, or the door frame so as to be raised and lowered therealong, and the weather strip has a seal member for providing a seal between the interior surface of the window glass and the division member or the door frame. The seal member includes an attaching base part, a window glass seal lip extending from a surface of the attaching base part, which faces the window glass, and contacting the interior surface of the window glass, a support member formed integrally with the window glass seal lip toward the attaching base part, or a support member formed integrally with the attaching base part toward the window glass seal lip, a door seal lip extending from an attaching reference surface of the attaching base part, which contacts the division member, in a direction toward an interior side of the automobile and extending obliquely in an outer circumference direction thereof, and an attaching engaging part for engagement with the division member, which extends from the attaching reference surface of the attaching base part in the direction toward the interior side of the automobile, inwardly of a part from which the door seal lip extends. And when the window glass seal lip of the seal member contacts the interior surface of the window glass, the support member contacts the attaching base part or the window glass seal lip to press the attaching base part.

With the arrangement of the first aspect of the present invention, in a weather strip for an automobile, which is attached to a door frame of an automobile door to provide a seal against an interior surface of a window glass, the window glass is guided with a division member attached to the automobile door, or the door frame so as to be raised and lowered therealong. As a result, the window glass can be smoothly raised and lowered within the automobile door.

The weather strip has a seal member adapted to provide a seal between the window glass and the division member or the door frame. As a result, when the seal member is attached to the division member, the seal member contacts the interior surface of the window glass to securely provide a seal between the interior surface of the window glass and the division member, thereby preventing rain water and dust from intruding into an interior of the automobile door.

The seal member includes an attaching base part and a window glass seal lip extending from a surface of the attaching base part, which faces the window glass, so as to contact the interior surface of the window glass. When the attaching base part is attached to the division member, the window glass seal lip contacts the interior surface of the window glass to provide a seal against the interior surface of the window glass.

A support member is further provided so as to be formed integrally with the window glass seal lip and extend toward the attaching base part, or another support member is provided so as to be formed integrally with the attaching base part and extend toward the window glass seal lip. As a result, when the window glass seal lip contacts the interior surface of the window glass, the support member contacts the attaching base part or the window glass seal lip to receive a pressing force from the window glass seal lip and press a door seal lip against the division member by way of the attaching base part, thereby improving the sealing properties.

The door seal lip is further provided to extend from an attaching reference surface of the attaching base part, which contacts the division member, in a direction toward an interior side of the automobile and extending obliquely in an outer circumference direction thereof. As a result, a seal between the attaching base part of the weather strip and the division member can be provided.

An attaching engaging part for engagement with the division member, which extends from the attaching reference surface of the attaching base part in the direction toward the interior side of the automobile, is further provided inwardly of a part from which the door seal lip extends. As a result, by inserting the attaching engaging part into the division member, the seal member can be held with the division member.

When the window glass seal lip of the seal member contacts the interior surface of the window glass, the support member contacts the attaching base part or the window glass seal lip to press the attaching base part. Therefore, when the window glass is closed, a pressing force of the support member is transmitted to the door seal lip by way of the attaching base part to press the door seal lip against the division member, thereby improving the sealing properties.

In accordance with a second aspect of the present invention, the attaching reference surface has a groove close to a root of the door seal lip.

With the arrangement of the second aspect of the present invention, the attaching reference surface has a groove close to a root of the door seal lip so that no protruding part exists in an area where the door seal lip is continuous with the attaching reference surface, whereby the attaching base part of the seal member can be stably held with the division member to improve the sealing properties.

In accordance with a third aspect of the present invention, a seal lip side surface is defined in a surface of the attaching base part outwardly of the attaching reference surface such that the seal lip side surface is positioned outwardly of the attaching reference surface in a direction toward an exterior side of the automobile with a distance greater than the thickness of the door seal lip.

With the arrangement of the third aspect of the present invention, a seal lip side surface is defined in a surface of the attaching base part outwardly of the attaching reference surface such that the seal lip side surface is positioned outwardly of the attaching reference surface in a direction toward an exterior side of the automobile with a distance greater than the thickness of the door seal lip. Therefore, the door seal lip is bent to contact the attaching base part, whereby the attaching base part of the seal member can be stably held with the division member to improve the sealing properties without pushing the attaching base part upwardly with the door seal lip.

In accordance with a fourth aspect of the present invention, a turning restriction member is further provided to extend from the attaching engaging part in an inner circumference direction thereof, and contact the division member.

With the arrangement of the fourth aspect of the present invention, a turning restriction member is further provided to extend from the attaching engaging part in an inner circumference direction thereof, and contact the division member. As a result, when the attaching base part is about to be turned with a reaction force of the door seal lip of the seal member, the turning restriction member contacts the division member to stop the turning of the attaching base part, whereby the sealing properties of the door seal lip and the window glass seal lip can be improved.

In accordance with a fifth aspect of the present invention, the tip end or the root of the support member is located between a line extending from the tip end of the door seal lip in the direction toward the exterior side of the automobile, and a line extending from an edge of the attaching engaging part, which is located in an outer circumference direction thereof, in the direction toward the exterior side of the automobile.

With the arrangement of the fifth aspect of the present invention, the tip end or the root of the support member is located between a line extending from the tip end of the door seal lip in the direction toward the exterior side of the automobile, and a line extending from an edge of the attaching engaging part, which is located in an outer circumference direction thereof, in the direction toward the exterior side of the automobile. As a result, the support member securely transmits a pressing force to the attaching base part from the tip end or the root thereof, thereby preventing the attaching base part from being turned with a repulsion force of the door seal lip to deteriorate the sealing properties.

In accordance with a sixth aspect of the present invention, the support member is formed so as to be curved from the tip end of the window glass seal lip, and extend integrally therewith, and obliquely in the direction toward the interior side of the automobile and in the inner circumferential direction thereof.

With the arrangement of the sixth aspect of the present invention, the support member is formed so as to be curved from the tip end of the window glass seal lip, and extend integrally therewith, and obliquely in the direction toward the interior side of the automobile and in the inner circumferential direction thereof. As a result, when the window glass seal lip contacts the interior surface of the window glass, the tip end of the window glass seal lip is greatly bent to securely press the support member against the attaching base part.

In accordance with a seventh aspect of the present invention, an interior part seal lip adapted to cover a tip end of an interior part is formed to extend from the root of the window glass seal lip.

With the arrangement of the seventh aspect of the present invention, an interior part seal lip adapted to cover a tip end of an interior part is formed to extend from the root of the window glass seal lip. As a result, a gap between the seal member and the interior part can be closed, thereby improving the appearance therearound.

Since the support member is provided so as to be formed integrally with the window glass seal lip to extend toward the attaching base part or to be formed integrally with the attaching base part to extend toward the window glass seal lip, when the window glass seal lip contacts the interior surface of the window glass, the support member generates a pressing force against the attaching base part. As a result, when the widow glass is closed, the pressing force of the support member is transmitted to the door seal lip by way of the attaching base part, whereby the door seal lip is pressed against the division member to improve the sealing properties.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 2 is a front view of a weather strip;

FIG. 3 is a cross-sectional view of a conventional weather strip, which is attached to a vertical side of a door frame;

FIG. 5 is a cross-sectional view taken along the line A-A of FIG. 2 and is a second embodiment of a weather strip in accordance with the present invention.

DETAILED DESCRIPTION OF THE PREFERRED EMBODIMENTS

Embodiments of the present invention will be explained with reference to FIGS. 1, 2, 4 and 5.

Figure 1:
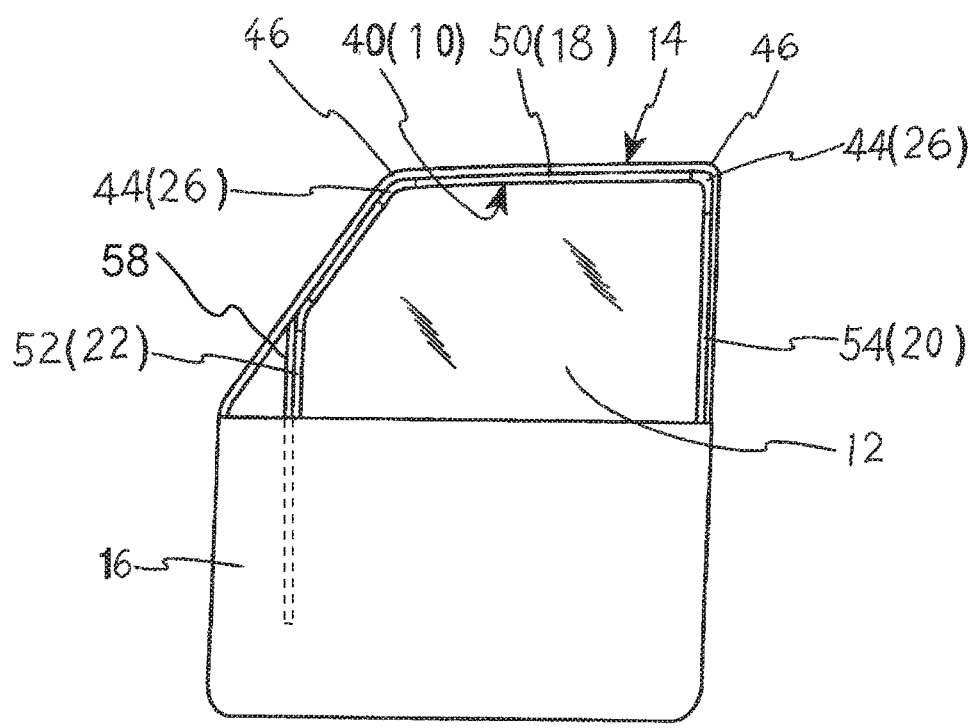
FIG. 1 is a front view of an automobile door.

FIG. 1 is a front view of a front door 16 of an automobile. FIG. 2 is a front view of a weather strip 40 for attachment to a door frame 14 of the front door 16. As shown in FIG. 1, the door frame 14 is provided in an upper part of the door 16, and a window glass 12 is attached thereto so as to be raised and lowered therealong. Namely, the weather strip 40 is attached to the door frame 14 to provide a seal between the window glass 12 and the door frame 14.

As shown in FIG. 2, the weather strip 40 is entirely formed of a thermoplastic elastomer or a synthetic resin, and includes straight parts 42, each being formed by extrusion, and corner parts 44, each being attached to a corner part 46 of the door frame 14, connecting the straight parts 42 to each other, and being formed by molding.

The straight parts 42 include an upper side part 50 for attachment to an upper side of the door frame 14, a front vertical side part 52 for attachment to a front vertical side of the door frame 14, and a rear vertical side part 54 for attachment to a division sash defining a rear vertical side of the door frame 14.

In order to form these extruded parts in conformity with the configuration of the door frame 14, the corner parts 44 are formed in front and rear corners by molding to connect the straight parts 42 to each other. The corner parts 44 of the weather strip 40 are attached to the corners 46 of the door frame 14.

The rear vertical side part 54 of the weather strip 40 in a first embodiment of the present invention will be explained with reference to FIG. 4. The present embodiment will be explained with reference to the rear vertical side part 54 of the weather strip 40, which is attached to the front door, for example. The present invention is also applied to weather strips 40 which are attached to other parts of the front door and the rear door.

Figure 4:
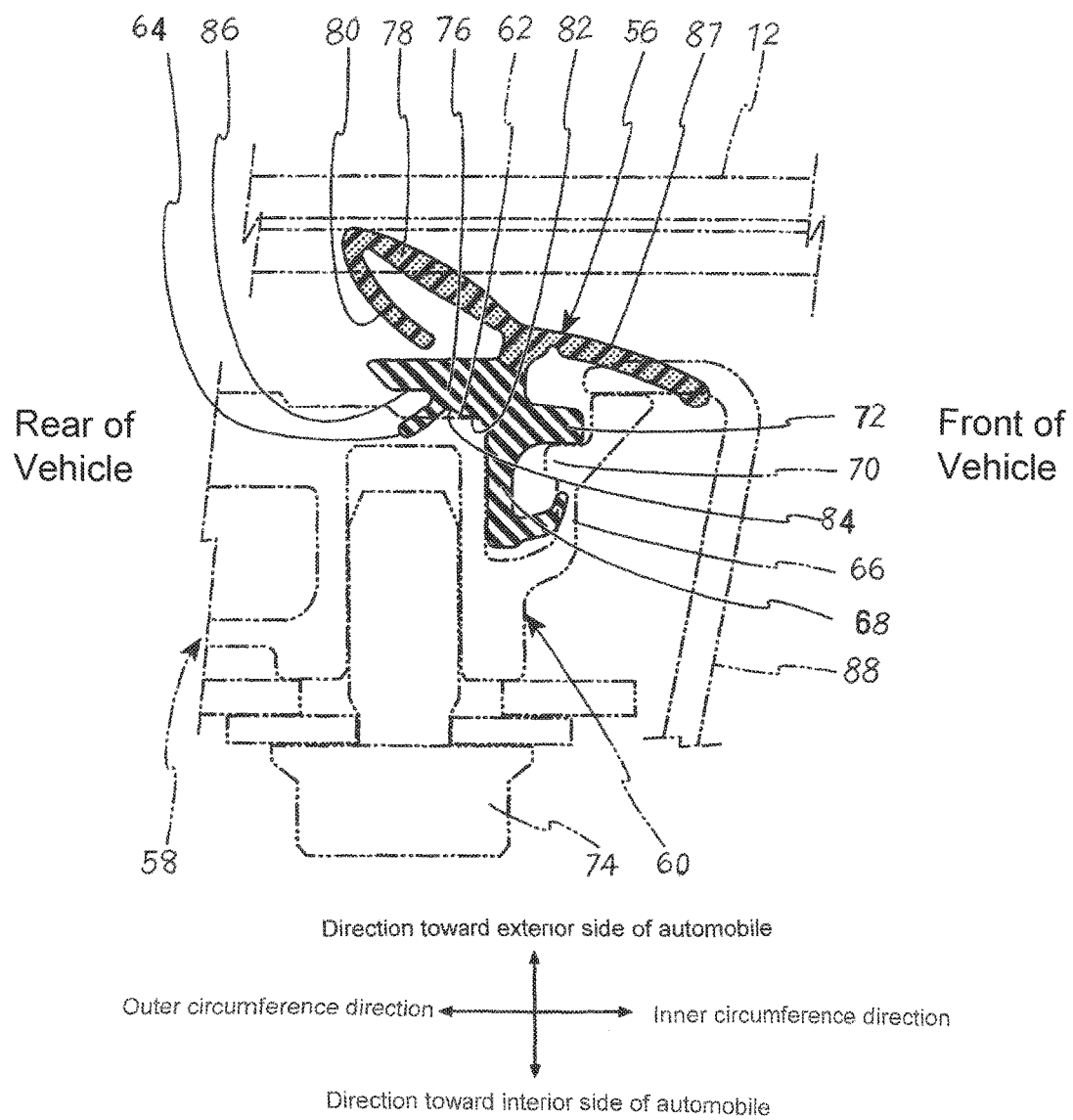
FIG. 4 is a cross-sectional view taken along the line A-A of FIG. 2 and is a first embodiment of a weather strip in accordance with the present invention.

In FIG. 4, the upward direction designates a direction toward an exterior side of an automobile, the downward direction designates a direction toward an interior side of the automobile, the right direction designates an inner circumference direction of the door frame 14 and the weather strip 40, and the left direction designates an outer circumference direction of the door and the weather strip 40.

As shown in FIG. 4, the weather strip 40 of the present invention has a seal member 56 for providing a seal between the interior surface of the window glass 12 and a division member 58, and in addition to the seal member 56, seal members for providing a seal between a tip end of the window glass 12 and the division member 58, and for providing a seal between a slider member and the division member 58 can be used together.

First, the division member 58 will be explained, and next the seal member 56 will be explained.

The division member 58 is formed of aluminum by extrusion. The division member 58 has an attaching part 60 for attaching the seal member 56. In addition, the division member 58 can have attaching parts for attaching a seal member for providing a seal between the tip end of the window glass 12 and the division member 58, and another seal member for providing a seal between the slider member and the division member 58.

The attaching part 60 is formed to have a rectangular cross-section of which an upper surface is closed, and the upper surface of the attaching part 60 defines an attaching reference surface 62 for contacting a later-described door seal lip 64 of the seal member 56.

The attaching part 60 has an attaching groove 66 on an outer surface thereof in the inner circumference direction for engagement with a later-described engaging part 68 of the seal member 56. And the attaching groove 66 has an attaching step 70 for contacting a later-described turning restriction member 72.

The attaching part 60 is secured to a door outer panel and a door inner panel with an attaching screw 74.

A slider member having an approximately U-shaped cross-section can be attached to an interior surface of the tip end of the window glass 12. One side wall of the slider member is secured to the tip end of the interior surface of the window glass 12 with an adhesive. A weather strip for guiding the sliding of the slider member is attached in an interior space of the slider member, which has a U-shaped cross-section.

Next, the seal member 56 will be explained.

The seal member 56 is formed by extrusion, and is made of a synthetic rubber or a thermostatic elastomer. In the present embodiment, an identical kind of material was used, but different kinds of materials can be also used.

In the present embodiment, the seal member 56 adapted to provide a seal between the interior surface of the window glass 12 and the division member 58 was used. However, where the seal member for providing a seal between the tip end of the window glass 12 and the division member or a triangular garnish part, and the seal member for providing a seal between the slider member and the division member are used together, the two seal members are formed by dividing a larger seal member.

In this case, the seal member 56 can provide a seal between the interior surface of the window glass 12 and the division member 58, and other seal members can provide a seal between the tip end of the window glass 12 and the division member 58 or the triangular garnish part, and between the window glass 12 and a door opening portion. In addition, where the seal member 56 is formed so as to be divided from other seal members, the production of the seal member 56 is facilitated, and these seal members can be attached to the division member 58 separately from each other to facilitate the attaching work of the seal members.

The seal member 56 in the first embodiment of the present invention will be explained with reference to FIG. 4. The seal member 56 includes an attaching base part 76 having a plate-shaped cross-section, and a window glass seal lip 78 projecting from a side edge of the attaching base part 76 in the outer circumference direction, which faces the window glass 12, and extending obliquely in the direction toward the exterior side of the automobile to contact the interior surface of the window glass 12.

The window glass seal lip 78 extends from the attaching base part 76 obliquely toward the tip end of the window glass 12, and when the window glass 12 is closed, the window glass seal lip 78 contacts the interior surface of the window glass 12 to provide a seal between the interior surface of the window glass 12 and the seal member 56.

The window glass seal lip 78 can be provided with a low friction sliding layer in a surface adapted to contact the window glass 12 in the direction toward the exterior side of the automobile. The low friction sliding layer can be formed by applying a material exhibiting a small sliding resistance such as a thermoplastic elastomer containing a high ratio of an olefin part, a silicone resin or a urethane resin.

A lip-shaped support member 80 is formed integrally with a tip end of the window glass seal lip 78 so as to be bent toward the attaching base part 76 or in the direction toward the interior side of the automobile, and obliquely in the inner circumference direction. A tip end of the support member 80 is formed so as to separate from an exterior surface of the attaching base part 76 when the window glass 12 is opened, and so as to contact the exterior surface of the attaching base part 76 when the window glass 12 is closed.

As a result, when the window glass 12 is closed, the window glass seal lip 78 contacts the interior surface of the window glass 12, and the tip end of the window glass seal lip 78 is greatly bent, whereby the tip end of the support member 80 presses the attaching base part 76 and accordingly, the support member 80 can securely press the attaching base part 76.

It is preferable to locate the tip end of the support member 80 between a line extending from a later-described tip end of the door seal lip 64 in the direction toward the exterior side of the automobile and a line extending from a later-described exterior edge of the attaching engaging part 68 in the direction toward the exterior side of the automobile. In this case, the tip end of the support member 80 contacts the attaching base part 76 so that a pressing force is securely transmitted to the attaching base part 76, whereby the attaching base part 76 is turned due to a repulsive force of the door seal lip 64 to prevent deterioration of the sealing properties.

The door seal lip 64 projects from an attaching reference surface 82 which contacts the attaching reference surface 62 of the attaching part 60 of the division member 58, so as to extend in a direction toward an interior side of the automobile, and obliquely extend in an outer circumference direction thereof. The tip end of the door seal lip 64 contacts the attaching reference surface 62 of the division member 58.

As described above, when the tip end of the window glass seal lip 78 is greatly bent, and the tip end of the support member 80 presses the attaching base part 76, the tip end of the door seal lip 64 strongly contacts the attaching reference surface 62 of the division member 58 and accordingly, the sealing properties between the door seal lip 64 and the attaching reference surface 62 can be improved.

A groove 84 is provided in the attaching reference surface 82 close to a root of the door seal lip 64. As a result, the root of the door seal lip 64 is connected to the attaching base part 76 outwardly of the attaching reference surface 82 so that the door seal lip 64 contacts the attaching reference surface 62 in a flexibly deformable area of the door seal lip 64, whereby the attaching base part 76 of the seal member 56 can be stably held with the attaching reference surface 62 of the division member 58 so that the sealing properties are improved.

A seal lip side surface 86 is provided in a surface of the attaching base part 76, which faces the attaching reference surface 62, outwardly of the attaching reference surface 82 and outwardly of the root of the door seal lip 64. The seal lip side surface 86 is positioned in the direction toward the exterior side of the automobile away from the attaching reference surface 82 with a distance greater than the thickness of the door seal lip 64.

As a result, if the door seal lip 64 is bent, and is sandwiched between the attaching reference surface 62 and the sealing lip side surface 86, the attaching reference surface 82 of the attaching base part 76 is stably held with the attaching reference surface 62 of the division member 58 without pushing the attaching base part 76 with the door seal lip 64 upwardly so that the sealing properties can be ensured.

A garnish seal lip 87 serving as an interior part seal lip, projects from a surface of the attaching base part 76, which faces the window glass 12, in the inner circumference direction opposite to the extending direction of the window glass seal lip 78. A tip end of the garnish seal lip 87 contacts a tip end of a garnish 88 as an interior part attached inwardly thereof, thereby covering a gap between the garnish 88 and the seal member 56 to improve the appearance therearound.

The attaching base part 76 has the attaching engaging part 68 projecting inwardly of the door seal lip 64 extending from the attaching reference surface 82 of the attaching base part 76 in the direction toward the interior side of the automobile for engagement with the attaching groove 66 of the division member 58. A tip end of the attaching engaging part 68 curves into a hook-shaped configuration, and is engaged with the attaching groove 66. With this arrangement, by inserting the attaching engaging part 68 into the attaching groove 66 of the division member 58, the seal member 56 can be held with the attaching part 60 of the division member 58.

The turning restriction member 72 projects from the attaching engaging part 68 in the inner circumference direction for contacting the attaching step 70 provided in the attaching groove 66 of the division member 58. When the door seal lip 64 contacts the attaching reference surface 62 to turn the attaching base part 76 about the tip end of the attaching engaging part 68, the turning restriction member 72 contacts the attaching step 70 of the division member 58, whereby the turning of the attaching base part 76 can be stopped. As a result, the posture of the seal member 56 can be continuously made stable to prevent the window glass from coming loose or off when the window glass slides upwardly and downwardly, and improve the sealing properties between the door seal lip 64 and the window glass seal lip 78.

A second embodiment of the present invention will be explained with reference to FIG. 5. The configurations of the support member and the turning restriction member of the second embodiment differ from those of the first embodiment. In addition, no garnish seal lip is provided. Remaining parts of the second embodiment are substantially similar to those of the first embodiment. Accordingly, explanations of similar parts will be omitted.

In the second embodiment, a seal member 90 includes a window glass seal lip 92 projecting from an attaching base part 94 and contacting the interior surface of the window glass 12, but no support member projects from a tip end of the window glass seal lip 92. In the second embodiment, a support member 96 extends obliquely from the attaching base part 94 toward the tip end of the window glass seal lip 92.

With this arrangement, when the window glass 12 is closed, the window glass seal lip 92 contacts the interior surface of the window glass 12, and the tip end of the window glass seal lip 92 is greatly bent to contact and press the support member 96, whereby a root of the support member 96 can securely press the attaching base part 94.

It is preferable to locate the root of the support member 96 between a line extending from a tip end of a door seal lip 98 in a direction toward the exterior side of the automobile and a line extending from an exterior edge of an attaching engaging part 100 in the direction toward the exterior side of the automobile. In this case, the root of the support member 96 presses the attaching base part 94 so that a pressing force is securely transmitted to the attaching base part 94, whereby the attaching base part 94 is turned due to a repulsive force of the door seal lip 98 to prevent deterioration of the sealing properties.

The door seal lip 98 projects from an attaching reference surface 106 contacting a sealing reference surface 102 of an attaching part 104 of the division member 58 in a direction toward the interior side of the automobile and obliquely extend in an outer circumference direction thereof, similarly to the first embodiment. And a groove 106 is provided in an attaching reference surface 108 close to a root of the door seal lip 98, similarly to the first embodiment.

In the second embodiment, no garnish seal lip is provided, but such a garnish seal lip can be formed where any garnish is provided.

The attaching base part 94 has the attaching engaging part 100 for engagement with an attaching groove 110 of the division member 58. A tip end of the attaching engaging part 100 curves into a hook-shaped configuration, and is engaged with the attaching groove 110.

A turning restriction member 112 extends from the attaching base part 94 continuously and integrally therewith in an inner circumference direction of the attaching engaging part 100 to contact a tip end surface of the attaching part 104 of the division member 58. When the door seal lip 98 contacts the attaching reference surface 102 to turn the attaching base part 94 about the tip end of the attaching engaging part 100 the turning restriction member 112 contacts the tip end surface of the attaching part 104 of the division member 58, whereby the turning of the attaching base part 94 can be stopped. As a result, the sealing properties between the door seal lip 98 and the window glass seal lip 92 can be improved.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip attached to a frame of a door of an automobile, the frame including a front vertical side part, a rear vertical side part, and an upper side part, the weather strip being disposed between and providing a seal between an interior surface of a window glass of the door and a division member attached to at least one of the front vertical side part and the rear vertical side part, wherein the window glass is guided by the frame as the window glass is raised and lowered therealong, comprising:
    an attaching base part;
    a window glass seal lip extending from a surface of the attaching base part generally in an outer circumference direction, the window glass seal lip facing the window glass, and contacting the interior surface of the window glass;
    a support member formed either 1) integrally with the window glass seal lip and extending from the window glass seal lip toward the attaching base part, or 2) integrally with the attaching base part and extending from the attaching base part toward the window glass seal lip;
    a door seal lip which contacts the division member and which extends from an attaching reference surface of the attaching base part in a direction toward an interior of the automobile; and
    an attaching engaging part which engages the division member, a first part of the attaching engaging part extending from the attaching reference surface of the attaching base part in the direction toward the interior of the automobile, a second part of the attaching engaging part extending from the attaching base part in an inner circumference direction which is a direction that is opposite to the outer circumference direction, such that when the window glass seal lip contacts the interior surface of the window glass, the support member contacts one of the attaching base part and the window glass seal lip to press the attaching base part,
    wherein the attaching base part includes a seal lip side surface, the seal lip side surface being positioned in the outer circumference direction relative to the attaching reference surface and extending in the outer circumference direction, a distance between the seal lip side surface and the attaching reference surface being greater than a thickness of the door seal lip; and
    wherein vertical ends of the window glass extend beyond an entirety of the weather strip when the window glass and the weather strip are viewed in horizontal cross section looking generally perpendicular to the window glass.

2. The weather strip as claimed in claim 1, wherein the attaching reference surface has a groove adjacent to a root of the door seal lip.

3. The weather strip as claimed in claim 1, wherein the second part of the attaching engaging part comprises a turning restriction member which contacts the division member.

4. The weather strip as claimed in claim 1, wherein one of a tip end and a root of the support member is located between a line extending generally perpendicular to the window glass from a tip end of the door seal lip and a line extending generally perpendicular to the window glass from an edge of the first part of the attaching engaging part.

5. The weather strip as claimed in claim 1, wherein the support member is curved and extends obliquely in the direction toward the interior of the automobile and in the inner circumference direction.

6. The weather strip as claimed in claim 1, wherein an interior part seal lip, adapted to cover a tip end of an interior part, extends from a root of the window glass seal lip.

* * * * *